United States Patent [19]

Kondo

[11] Patent Number: 5,446,764

[45] Date of Patent: Aug. 29, 1995

[54] COMMUNICATION CONTROL DEVICE

[75] Inventor: Koji Kondo, Kamakura, Japan

[73] Assignee: Mitsubishi Denki Kabushiki Kaisha, Tokyo, Japan

[21] Appl. No.: 21,343

[22] Filed: Feb. 23, 1993

[30] Foreign Application Priority Data

Apr. 2, 1992 [JP] Japan .................... 4-080648

[51] Int. Cl.$^6$ ............................. H04L 7/00
[52] U.S. Cl. .................... 375/354; 375/364; 370/105.5
[58] Field of Search ............ 375/8, 106, 118, 121, 375/113; 370/84, 102, 110.1, 112, 105.5

[56] References Cited

U.S. PATENT DOCUMENTS

| | | | |
|---|---|---|---|
| 3,585,298 | 6/1971 | Liberman | 375/119 |
| 4,884,269 | 11/1989 | Duncanson et al. | 375/121 |
| 4,894,847 | 1/1990 | Tjahjadi et al. | 375/121 |
| 4,953,180 | 8/1990 | Fleschi et al. | 375/7 |
| 5,033,064 | 7/1991 | Upp | 375/118 |
| 5,052,025 | 9/1991 | Duff et al. | 375/118 |

FOREIGN PATENT DOCUMENTS 0459686 12/1991 European Pat. Off.

OTHER PUBLICATIONS

CCITT Recommendation vol. 110 (1988), Fascicle VIII. I Rec. Vol. 110 Assoc., ITU.
IEEE Pacific Rim Conf. on Communications, Computers and Signal Processing May 1991 "An Improved Desynchronizer w/Reduced Wait". . . Contribution to T1 Standards Project, T1X1 Jun. 1989, Feb. 1989, pp. 297–300. Sonnet Desynchronisers.

Primary Examiner—Young Tse
Attorney, Agent, or Firm—Wolf, Greenfield & Sacks

[57] ABSTRACT

A communication control device includes (a) a rate adapting unit for inputting thereto a receive clock for receiving a signal and outputting the receive clock of which waveform is partially deformed; and (b) a receiver for receiving the signal based on the receive clock outputted from the rate adapting unit.

28 Claims, 8 Drawing Sheets

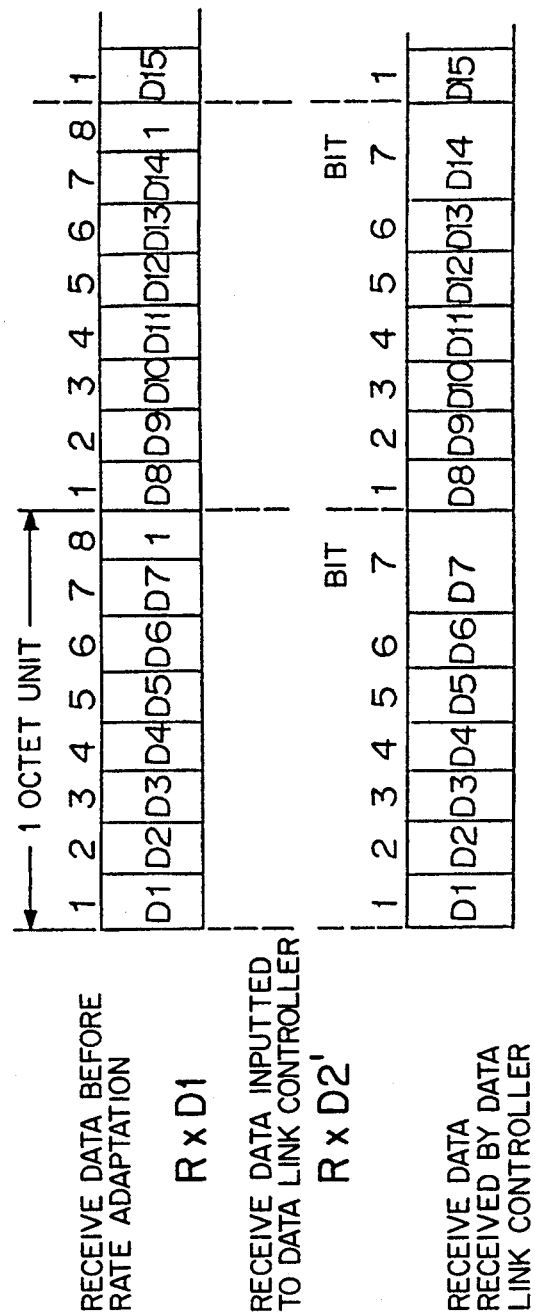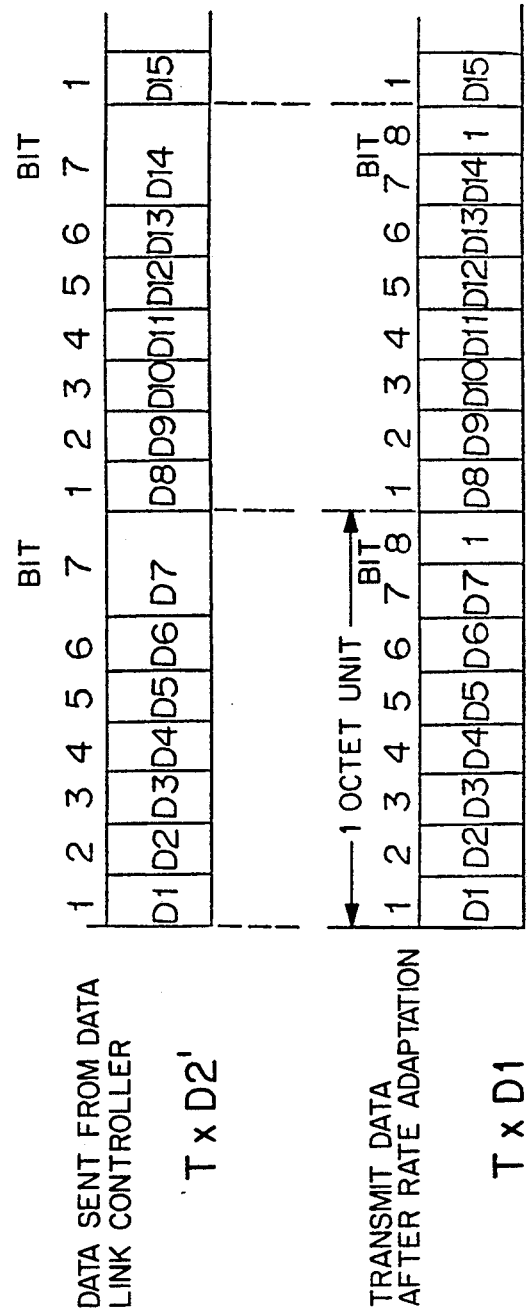

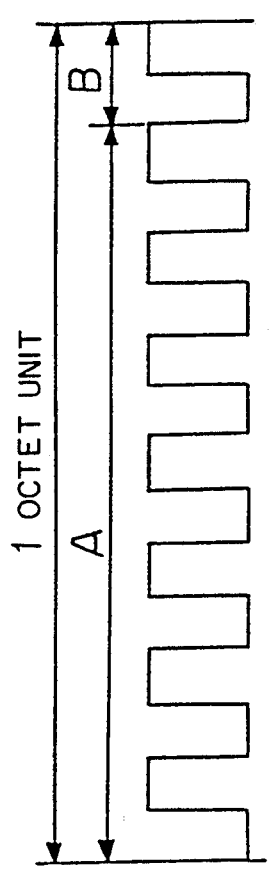
FIG. 4(a) CLOCK BEFORE RATE ADAPTATION (TxC1, RxC1)
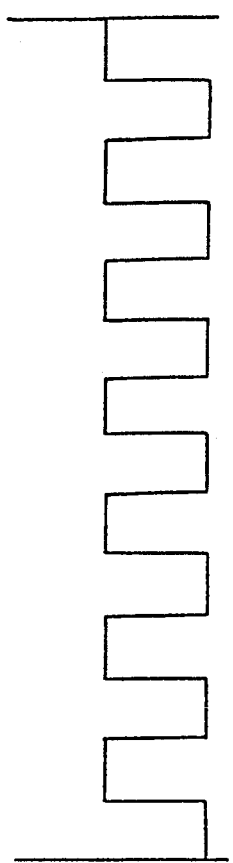
FIG. 4(b) CLOCK AFTER RATE ADAPTATION (CONVENTIONAL CASE) (TxC2, RxC2)
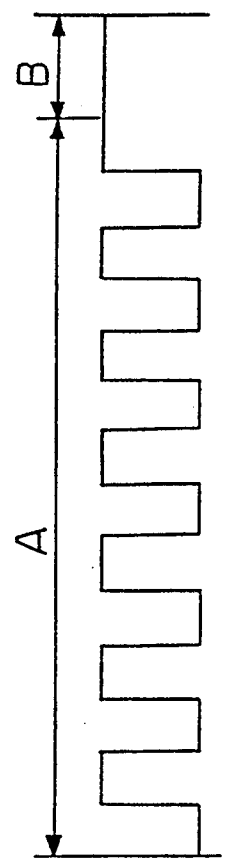
FIG. 4(c) DEFORMED CLOCK AFTER RATE ADAPTATION (INVENTED CASE) (TxC2', RxC2')

ADAPTION OF 56 KBIT/S USER RATE TO 64 KBIT/S
UNDER CCITT RECOMMENDATION V.110

| OCTET NUMBER | BIT NUMBER | | | | | | | |
|:---:|:---:|:---:|:---:|:---:|:---:|:---:|:---:|:---:|
| | 1 | 2 | 3 | 4 | 5 | 6 | 7 | 8 |
| 1 | D1 | D2 | D3 | D4 | D5 | D6 | D7 | 1 |
| 2 | D8 | D9 | D10 | D11 | D12 | D13 | D14 | 1 |
| 3 | D15 | D16 | D17 | D18 | D19 | D20 | D21 | 1 |
| 4 | D22 | D23 | D24 | D25 | D26 | D27 | D28 | 1 |
| 5 | D29 | D30 | D31 | D32 | D33 | D34 | D35 | 1 |
| 6 | D36 | D37 | D38 | D39 | D40 | D41 | D42 | 1 |
| 7 | D43 | D44 | D45 | D46 | D47 | D48 | D49 | 1 |
| 8 | D50 | D51 | D52 | D53 | D54 | D55 | D56 | 1 |

FIG. 6
(PRIOR ART)

RECEIVE DATA BEFORE RATE ADAPTATION
Rx D1

RECEIVE DATA AFTER RATE ADAPTATION
Rx D2

TRANSMIT DATA BEFORE RATE ADAPTATION
Tx D2

TRANSMIT DATA AFTER RATE ADAPTATION
Tx D1

COMMUNICATION CONTROL DEVICE

TECHNICAL FIELD

The present invention relates to a communication control device having a rate adapting function for adapting different transmitting rates or processing rates, for instance, such as rates of 64 kbit/s and 56 kbit/s.

BACKGROUND OF THE INVENTION

FIG. 5 is a construction diagram of a communication control device having a conventional rate adapting function.

In FIG. 5, a reference number 1 designates a communication network such as the Integrated Services Digital Network (ISDN), 2, a network interface unit which is a basic interface of the Integrated Services Digital Network, for separating an information channel (B-channel), 3, a rate adapting unit for adapting a transmitting rate and a user information rate between the network interface unit 2 and a communication control unit 4, 4, a communication control unit for performing a communication processing of layer 2 protocol or higher layer, and 41, a data link controller such as a HDLC (High-level Data Link Control) controller or a LAPB controller which transmits and receives data of layer 2.

Explanation will be given to the operation.

First, data from the communication network 1 is received by the network interface unit (layer 1) 2. A transmit data (TxD1), a receive data (RxD1), a transmit clock (TxC1), a receive clock (RxC1), and an octet synchronization signal (FR1) are inputted to or outputted from the rate adapting unit 3. A transmit clock (TxC2), a receive clock (RxC2), a transmit data (TxD2), and a receive data (RxD2) after rate adaptation are transmitted from or received by the data link controller 41, in the interaction between the rate adapting unit 3 and the communication control unit 4 which performs processing of layer 2 protocol or higher layer. The transmit clock (TxC1) and receive clock (RxC1) can be typical clock signals such as series of square wave pulses having at least two voltage or assertion levels, typically considered as an "ON" state and an "OFF" state, separated by rising and falling edges as shown in FIG. 4(a).

For instance, when the user information rate is 56 kbit/s in contrast to a transmitting rate of 64 kbit/s in the communication network 1, both the transmit clock and the receive clock before rate adaptation are for signals of the rate of 64 kbit/s, and both the transmit clock and the receive clock after rate adaptation are for signals of 56 kbit/s.

FIG. 6 is a diagram showing an adaptation rule for adapting a rate of 56 kbit/s to a rate of 64 kbit/s based on CCITT Recommendation V. 110. In FIG. 6, an octet number 1 consists of 8 bits of No. 1 to No. 8. Actually, data D1 to D7 are arranged at No. 1 to No. 7 bits. No. 8 bit is set to binary 1. Similarly, with respect to an octet number 2, data D8 to D14 are arranged to 7 bits of No. 1 to No. 7, and No. 8 bit is set to binary 1. In case of 64 kbit/s, 8 bits of No. 1 to No. 8 are to be transferred. In case of 56 kbit/s, 7 bits of No. 1 to No. 7 are sampled out and transmitted. When the rate of 64 kbit/s is converted to the rate of 56 kbit/s, binary 1 at No. 8 bit is ignored. Conversely, when the rate of 56 kbit/s is converted to the rate of 64 kbit/s, No. 8 bit is set to binary 1.

Next, the construction of the rate adapting unit 3 will be explained in detail using FIG. 7.

The respective transmit clock (TxC2) and the receive clock (RxC2) after rate adaptation are formed by a clock converting unit 37 utilizing the respective clocks (TxC1, RxC1) before rate adaptation and the octet synchronization signal (FR1). FIGS. 4(a) and 4(b) are diagrams showing clocks formed by the clock converting unit 37, wherein FIG. 4(a) indicates the clock before rate adaptation. 1 octet unit of the clock before rate adaptation is shown in FIG. 4(a). Corresponding to the respective bits, waveforms are formed and in this Example, the waveforms of 8 bits are formed. Furthermore, FIG. 4(b) shows the clock after rate adaptation, which is the clock for 56 kbit/s. In this Example, waveforms corresponding to 7 bits of No. 1 to No. 7 are formed, whereby seven waveforms are formed. Both in FIGS. 4(a) and 4(b), waveforms of duty 50 are inputted to the above waveforms or outputted therefrom.

First, the receive data (RxD1) is read by a receive data reading unit 36, and is memorized in a buffer memory 35. As shown in FIG. 8(a), 1 octet unit of data is memorized. As shown in FIG. 8(b), at the next timing, a receive data sending unit 34 reads out the data memorized in the buffer memory 35 and outputs as the receive data (RxD2) after rate adaptation to the communication control unit 4, in synchronism with the receive clock (RxC2) after rate adaptation.

On the other hand, the transmit data (TxD2) before rate adaptation is sent from the communication control unit 4 in synchronism with the transmit clock (TxC2) after rate adaptation, which is read by a transmit data reading unit 31 of the rate adapting unit 3, and is memorized by a buffer memory 32 as shown in FIG. 8(c). Furthermore, as shown in FIG. 8(d), in synchronism with the clock (TxC1) on the side of the network, successive to the content stored in the buffer memory 32, binary 1 is inserted into the transmit data at a required bit position (for instance, at No. 8 bit based on the rate adapting rule as in CCITT Recommendation V. 110), which is sent as a transmit data (TxD1) from a transmit data sending unit 33.

Since the conventional rate adapting unit of the communication control device is constructed as above, the respective clocks before and after rate adaptation, or, two kinds of clocks for instance, corresponding to the transmitting rates of 64 kbit/s and 56 kbit/s are necessary to generate the clock after rate adaptation. It makes the circuit construction complicated.

Furthermore, since the conventional device utilizes the buffer memories, a delay of 1 octet unit is caused for the data transmission.

It is an object of the present invention to solve above problems and to provide a communication control device which achieves the rate adaptation by a simple circuit construction, paying attention to data transmitting and receiving characteristics of the data link controller with respect to the clock.

SUMMARY OF THE INVENTION

According to a first aspect of the present invention, there is provided a communication control device comprising:

(a) a rate adapting unit for inputting thereto a receive clock for receiving a signal and outputting the receive clock of which waveform is partially deformed; and (b) a means of receiving the signal based on the receive clock outputted from the rate adapting unit.

According to a second aspect of the present invention, there is provided a communication control device comprising:

(a) a clock processing unit for inputting thereto a transmit clock and outputting a deformed clock made by partially deforming a waveform of the transmit clock;

(b) an outputting unit for outputting a first signal to be transmitted in synchronism with the deformed clock outputted from the clock processing unit; and (c) a transmit data processing unit for transmitting a second signal which is formed by superposing a predetermined signal to the first signal outputted from the outputting unit at a position corresponding to a deformed portion of the deformed waveform outputted from the clock processing unit.

The rate adapting unit or the clock processing unit in the first and the second aspects of the present invention, deforms a portion of waveforms of the clock before rate adaptation to get the clock after rate adaptation. Accordingly, it is not necessary to newly generate the clock after rate adaptation. Therefore, since the undeformed portions of the clock waveforms before and after rate adaptation, are synchronized, buffer memories are not necessary to transmit and receive data. Since it is not necessary to store the data in buffer memories, circuit construction is simplified. Moreover, no delay is caused as in the conventional case.

BRIEF DESCRIPTION OF THE DRAWINGS

In the drawings:

FIGS. 3(a) to 3(d) are explanatory diagrams of transmit data and receive data in an example of the present invention;

FIGS. 4(a) to 4(c) are explanatory diagrams showing clocks for transmitting data to and receiving data from a data link controller;

FIG. 6 is a diagram showing an adaptation table between rates of 64 kbit/s and 56 kbit/s based on CCITT Recommendation V. 110;

DESCRIPTION OF SPECIFIC EMBODIMENTS

Example 1

Figure 1:
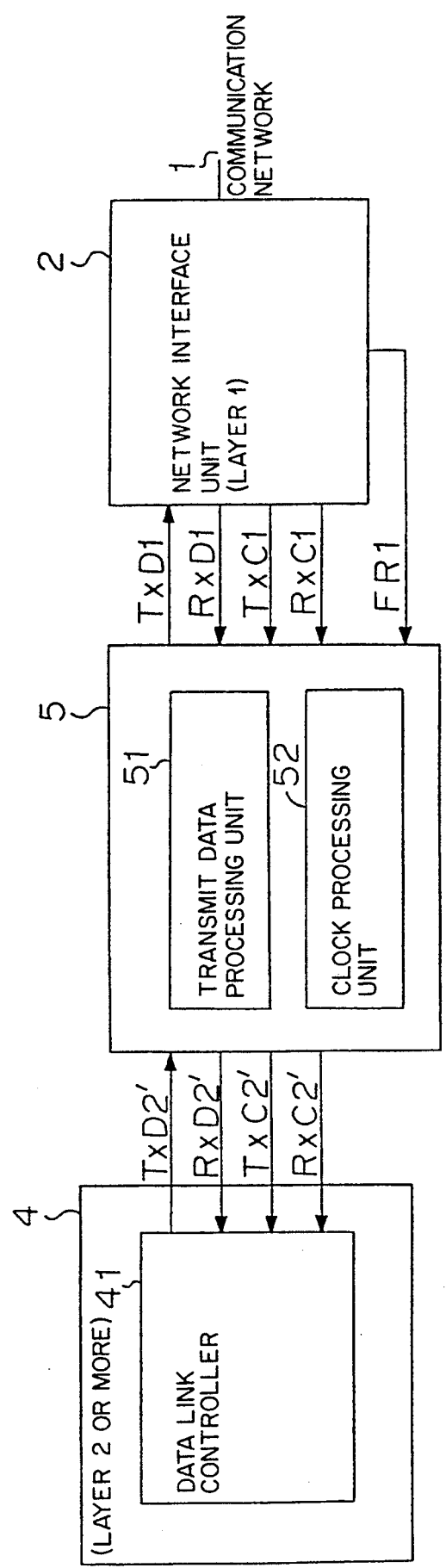
FIG. 1 is a construction diagram showing an embodiment of a communication control device having a rate adapting function according to the present invention.
Figure 5:
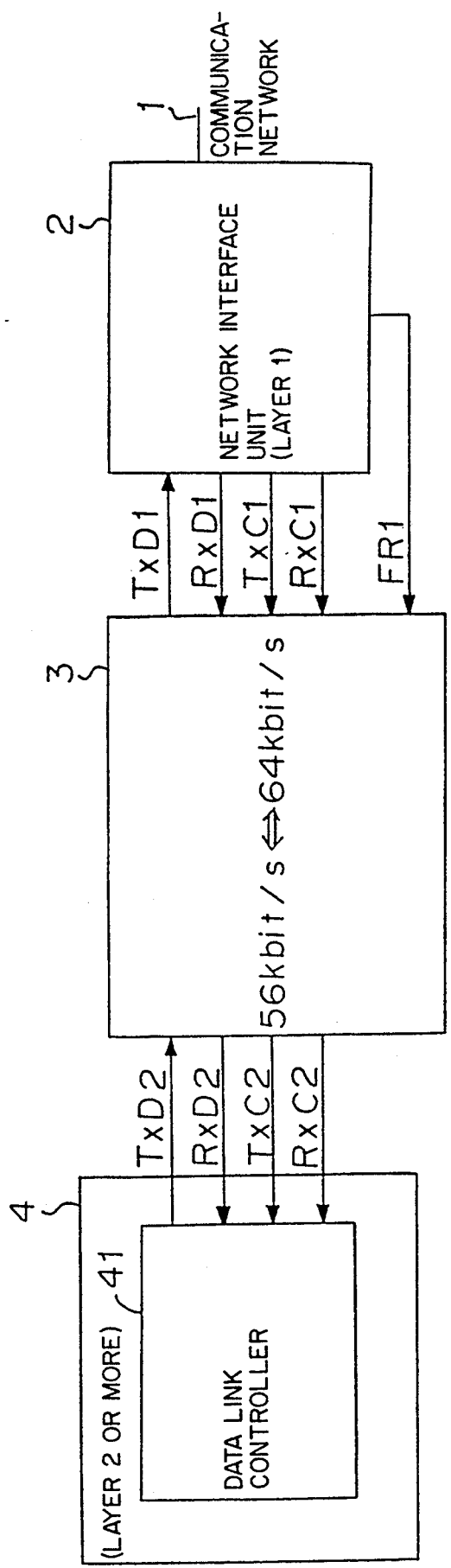
FIG. 5 is a construction diagram of a communication control device having a conventional rate adapting function.
Figure 7:
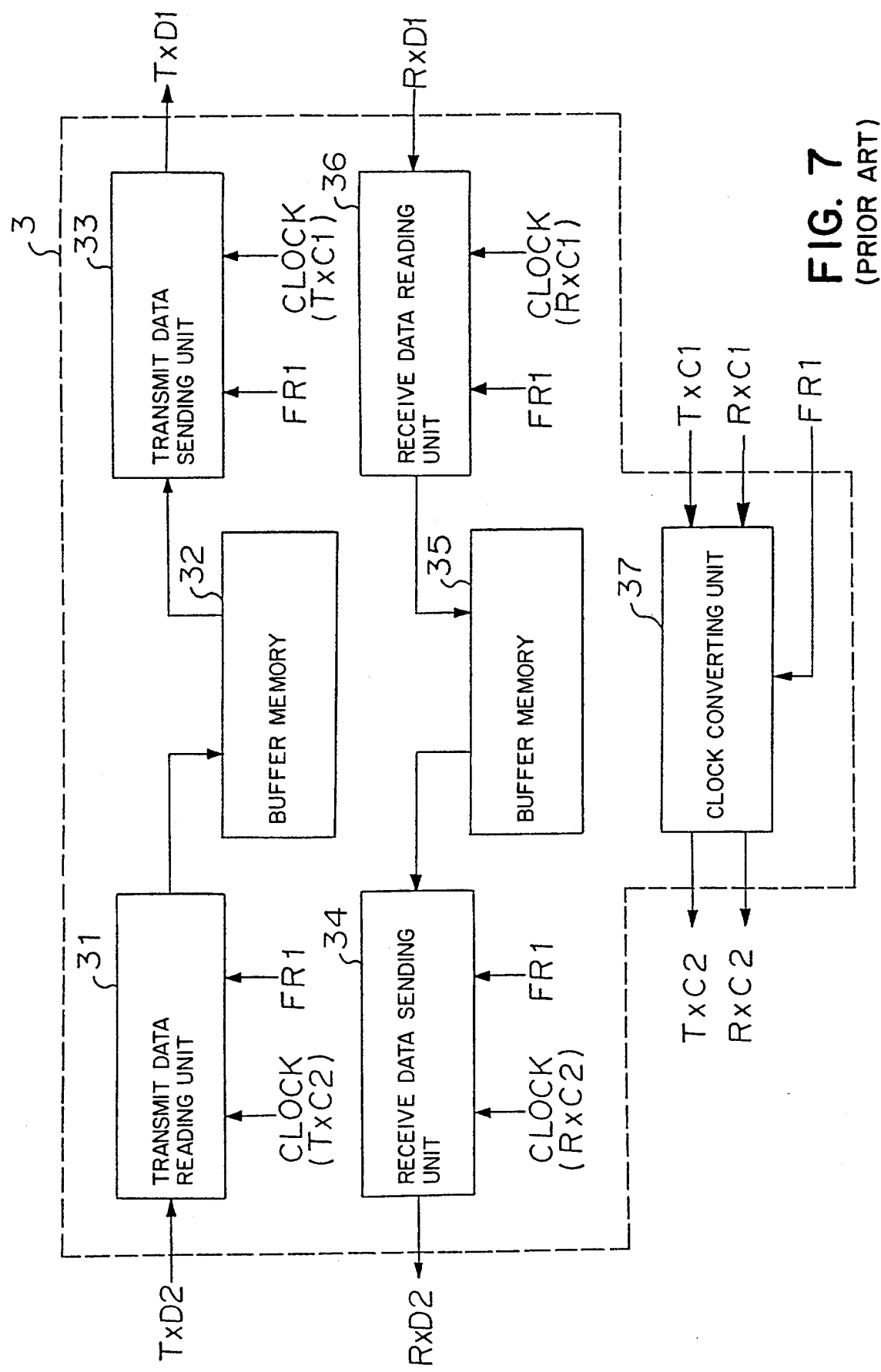
FIG. 7 is a construction diagram of a conventional rate adapting unit.
Figure 8A:
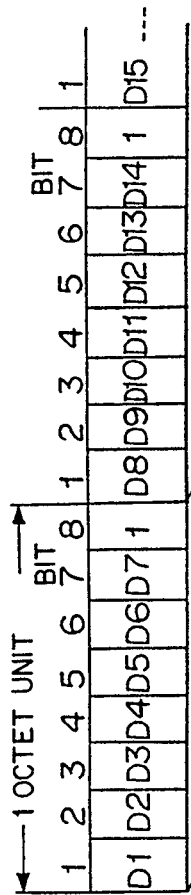
FIGS. 8(a) to 8(d) are explanatory diagram of transmit data and receive data before and after rate adaptation in the conventional case.
Figure 8B:
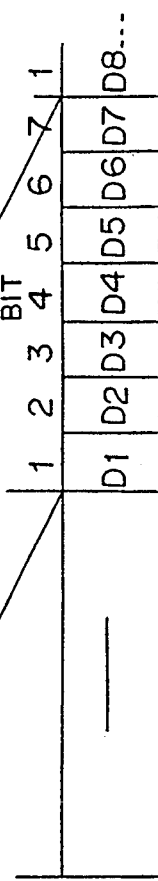
Figure 8C:
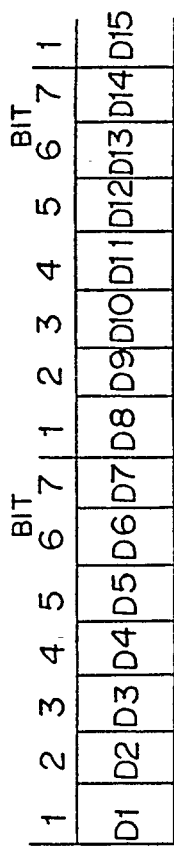
Figure 8D:
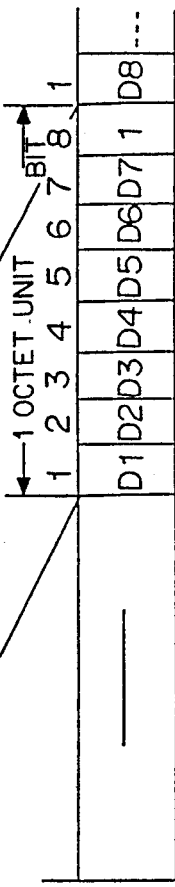

FIG. 1 is a construction diagram showing an embodiment of the present invention. In FIG. 1, a rate adapting unit 5 is disposed between the network interface unit 2 and the communication control unit 4 for achieving a rate adapting function, which is composed of a transmit data processing unit 51 and a clock processing unit 52. The transmit data processing unit 51 is composed of a transmit data forming unit 511 and a data forming unit 512. A data forming unit 512 forms a transmit data signal wherein a predetermined data, for instance, binary "1" at the position of bit No. 8, in case wherein the user information rate is 56 kbit/s, under CCITT Recommendation V. 110, is arranged at a predetermined bit position of a deformed clock. A transmit data forming unit 511 handles a transmit data after rate adaptation, and synthesizes the transmit data (TxD2') outputted from a data link controller, and the data formed by the data forming unit 512. (Refer to FIG. 2) The clock which is deformed as the receive clock (RxC2') is inputted to the data link controller and the receive data (RxD2') is inputted thereto as it is. On the other hand, with respect to the signal sending, the rate adapting unit 5 generates a deformed clock having the same waveform as RxC2', as clock (TxC2'), and generates TxD1 after rate adaptation by performing above treatment with respect to the output data (TxD2'). The other treatments are the same for those attached with the same notations in FIG. 5, and a detailed description will be omitted.

Next, explanation will be given to the operation.

Figure 2:
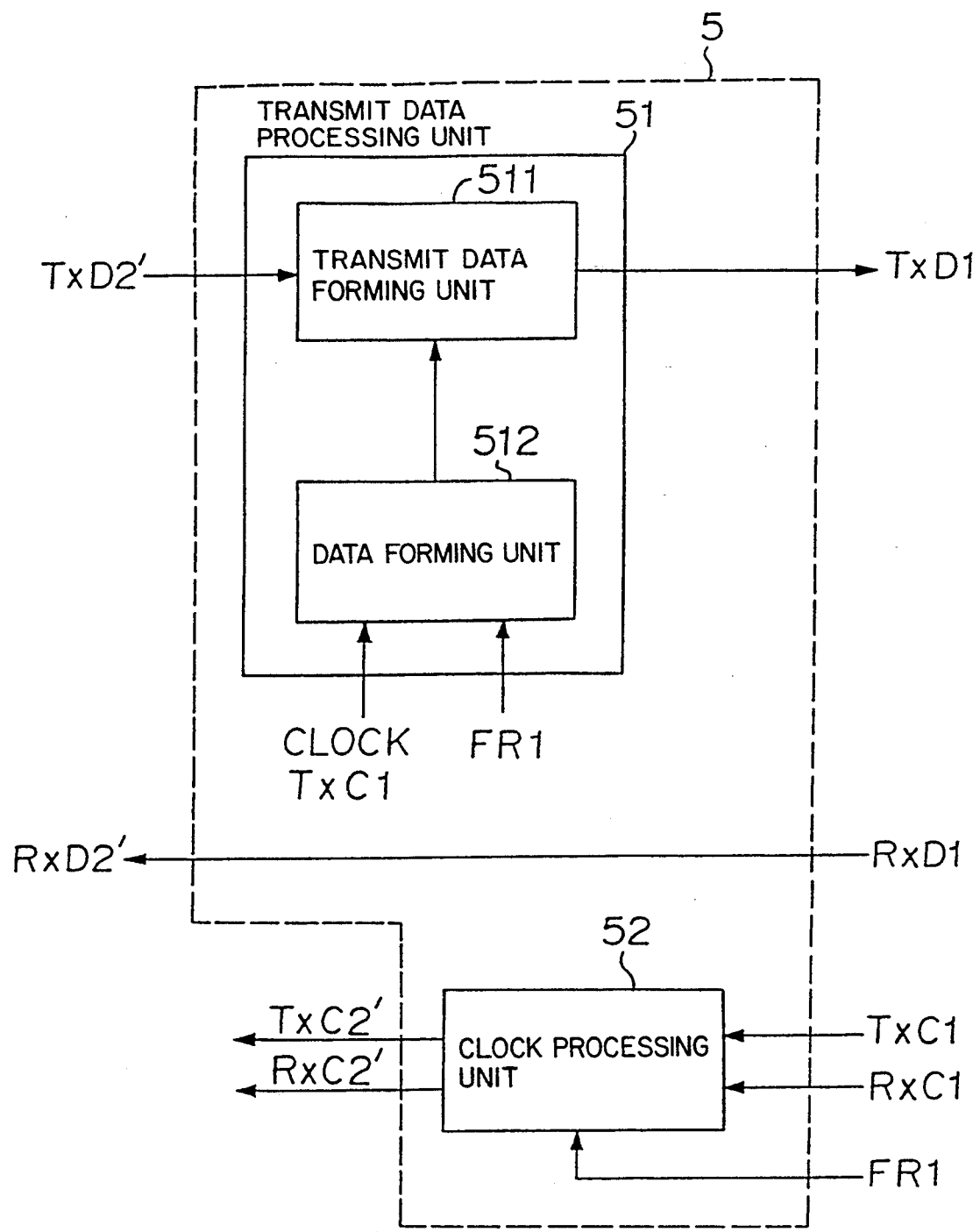
FIG. 2 is a construction diagram of an example of a rate adapting unit according to the present invention.

FIG. 2 is a construction diagram of the rate adapting unit.

First, as the transmit clock (TxC2') and the receive clock (RxC2') for the data link controller 41, as shown in FIG. 4(c), a deformed clock without reversing of clock signal is provided at the bit position which is to be skipped, in contrast to the basic clock before rate adaptation of FIG. 4(a). In the domain of A of FIG. 4(c), as in the domain of A of FIG. 4(a), waveforms of bits of No. 1 to No. 7 are shown. However, in the domain of B of FIG. 4(c), a deformation is performed wherein the signal is provided without reversing of the clock signal. That is to say, no waveform is provided at the position of No. 8 bit. The data link controller 41, by using such a deformed clock, skips the data of the corresponding bit position. For instance, when the data link controller 41 is constructed to read data at time points wherein the clock waveforms rises, in case wherein the data link controller 41 receives the data based on the deformed clock of FIG. 4(c), the number of the rise of the waveform is only 7, and the data corresponding to No. 8 bit is skipped. As shown in FIG. 2, the receive data RxD1 is not stored in a buffer memory as in the conventional case, but instead passes through the rate adapting unit 5, and is outputted directly to the communication control unit 4 as RxD2'. In this way, in this case wherein the receive data is outputted without being stored, as mentioned above, the data link controller 41 can ignore No. 8 bit of the receive data because the clock processing unit 52 deforms No. 8 bit of the receive clock. Therefore, as in the conventional case, it is possible to extract out the data up to No. 7 bit among the data of 8 bits inputted at the rate of 64 kbit/s, and to input the data to the data link controller.

FIGS. 3(a) and 3(b) are diagrams for explaining the operation of this signal receiving, wherein FIG. 3(a) shows the receive data before rate adaptation RxD1. Data D1 to D7 are recorded at No. 1 bit to No. 7 bit of 1 octet unit and binary 1 is recorded at No. 8 bit.

Furthermore, FIG. 3(b) indicates the receive data read by the data link controller based on the deformed clock, wherein data D1 to D7 are allocated at No. 1 bit to No. 7 bit. Binary 1 of No. 8 bit is skipped since the clock is deformed.

As for the receive data (RxD2') of the data link controller, the receive data (RxD1) from the network interface unit 2 is inputted thereto as it is, which is read based on the deformed receive clock (RxC2').

Next, explanation will be given to the case of signal sending.

The transmit data processing unit 51 receives the transmit data (TxD2') sent from the data link controller based on the deformed transmit clock (TxC2'). The data forming unit 512 forms the data wherein binary 1 is set to a predetermined bit position of the octet unit, at the position of No. 8 bit in case of CCITT Recommendation V. 110, based on the transmit clock (TxC1). The transmit data forming unit 511 synthesizes binary 1 and the transmit data (TxD2'), as the transmit data (TxD1) to the network interface unit 2.

In this way, also in case of signal sending, the rate adapting function can be achieved without delay and without using buffer memories. FIGS. 3(c) and 3(d) are diagrams showing specific Examples in case of the signal sending, wherein FIG. 3(c) indicates the data TxD2' sent from the data link controller. Data D1 to D7 are recorded at No. 1 bit to No. 7 bit. FIG. 3(d) shows the transmit data TxD1 after rate adaptation which is formed by the transmit data processing unit 51, wherein binary 1 is set at the position of No. 8 bit. In this way, No. 8 bit of each octet is set to binary 1 with respect to the data having an information quantity of 56 kbit/s, thereby forming and sending the information of 64 kbit/s.

As stated above, in this Example, the communication control device utilizes the digital network and has the rate adapting function which performs data transmission at the user information rate different from the transmission rate of the network. With respect to the receive data, the receive clock which is formed by partially deforming the receive clock from the network, is utilized and the receive data per se is read by the data link controller as it is. With respect to the transmit data, the clock formed by partially deforming the transmit clock from the network, is inputted as the transmit clock of the data link controller. The transmit data to the network is formed by superposing the predetermined data to the output signal from the data link controller which is sent in synchronism with the deformed transmit clock, at the predetermined bit position based on the rate adapting rule. In this way, the rate adapting function is achieved.

Furthermore, the communication control device performs the data transmission of the user information rate of 56 kbit/s by utilizing the digital network of the transmission rate of 64 kbit/s. It is provided with the clock processing unit which deforms the clock signal from the network and the transmit data processing unit which performs the treatment wherein the predetermined data is superposed to the data sent from the data link controller in synchronism with the deformed transmit clock at the corresponding predetermined bit in each octet unit.

Furthermore, the transmit data processing unit is provided with the rate adapting function constructed by the data forming unit which forms the data to be outputted to the predetermined bit position of each octet unit and the transmit data forming unit which synthesizes the transmit data sent from the data link controller in synchronism with the deformed transmit clock, and the data formed by the data forming unit.

As mentioned above, according to this Example, the clock before rate adaptation is deformed so that the data at the predetermined bit of each octet unit is skipped, which is utilized as the receive clock after rate adaptation, and the original receive data is read as it is. On the other hand, with respect to the transmit data, the predetermined data is superposed at the predetermined bit position in each octet unit in synchronism with the transmit clock. In this way, the rate adapting function between 64 kbit/s and 56 kbit/s, can be achieved in real time without buffer memories for the received data and transmit data in a simple circuit construction.

Example 2

In Example 1, the waveform at No. 8 bit is deformed and the data from No. 1 to No. 7 bit are sampled out. However, the position for deforming the waveform is not restricted to No. 8 bit, and may be, for instance, the bit position of No. 1 bit or other bit. In that case, the data to be skipped should be present at the bit position for the deforming. In Example 1, which is based on the CCITT Recommendation V. 110, the binary data 1 is added at the position of No. 8 bit. However, when No. 7 bit or No. 3 bit or the like is added as a dummy bit by the other rule, the waveform may be deformed so that these bits are ignored or added. The number of bits for the deforming is not restricted to 1 and may be 2 or 3 in a single octet unit. Furthermore, the unit for the deforming is not restricted to the unit of a single bit, and may be a unit of 2 bits or a unit of 3 bits or a unit of 1 octet or a unit of 1 record or the like by which the deformation is performed.

Example 3

In Example 1, the case is shown wherein the transmit rate is 64 kbit/s and the user information rate is 56 kbit/s, and the conversion is performed between the data of 8 bits and the data of 7 bits. However, the transmit rate is not restricted to 64 kbit/s and similarly, the user information rate is not restricted to 56 kbit/s. Accordingly, the present invention is not restricted to the conversion between 8 bits and 7 bits and the present invention can be provided with the similar effect in case of the conversion in the other bit numbers and the other information quantities.

As stated above, according to the present invention, the adaptability of the clock is established by deforming a portion of the clock received at the rate adapting unit. Accordingly, the communication control device can be provided achieving the rate adaptation by the simple circuit construction.

We claim:

1. A communication control device comprising:
   (a) a rate adapting unit including means for accepting a first receive clock having a first waveform, for receiving a digital signal having a plurality of discrete bits, each discrete bit being defined by a pair of clock edges in the first receive clock, and for outputting a second receive clock having a second waveform having at least one uneven portion; and
   (b) means for receiving each bit of at least a portion of the plurality of discrete bits of the digital signal synchronously with receipt of a clock edge of the second receive clock outputted from the rate adapting unit.

2. A communication control device comprising:
   (a) a clock processing unit including means for accepting a transmit clock and outputting a deformed clock made by deforming a portion of a waveform of the transmit clock;
   (b) output means for outputting a first digital signal having a plurality of discrete bits, each discrete bit being output synchronously with an edge of the deformed clock; and (c) a transmit data processing unit having means for transmitting a second digital signal synchronously with the transmit clock which is formed by superposing a predetermined digital signal onto the first digital signal outputted from the output means over a discrete bit of the first digital signal corresponding to the portion of the waveform of the transmit clock deformed by the clock processing unit.

3. A communication control device comprising:
(a) a rate adapting unit including means for accepting a first receive clock having a first waveform, means for receiving a digital signal having a plurality of discrete bits, each discrete bit being defined by a pair of clock edges in the first receive clock, means for partially deforming the first waveform to produce a second waveform having at least one irregular cycle, and means for outputting a second receive clock having the second waveform; and
(b) means for receiving each bit of at least a portion of the digital signal synchronously with receipt of a clock edge in the second receive clock.

4. A communication control device according to claim 3, wherein the second receive clock represents a lower rate with respect to the first receive clock.

5. The communication control device according to claim 4, wherein the second receive clock includes a series of short clock cycles, each short clock cycle having an ON period that is approximately half of a short clock cycle, and the irregular cycle having a deformed ON period approximately equal to three times the ON period.

6. The communication control device according to claim 5, wherein the second receive clock includes a sequence of six short cycles followed by one elongated cycle.

7. A communication control device comprising:
(a) a clock processing unit including means for accepting a transmit clock having a first waveform, and means for partially deforming the first waveform of the transmit clock to produce a deformed clock with a second waveform, the second waveform being a deformed waveform having (i) an undeformed portion that is identical to a portion of the waveform of the transmit clock and (ii) a deformed portion;
(b) output means for outputting a first digital signal having a plurality of discrete bits, each discrete bit being output in synchronism with an edge of the deformed clock; and
(c) a transmit data processing unit having means for accepting the first digital signal, means for forming a second digital signal by superimposing a predetermined digital signal over a discrete bit of the first digital signal at a position within the deformed portion of the second waveform, and means for transmitting the second digital signal synchronously with the transmit clock.

8. A communication control device according to claim 7, wherein the transmit clock represents a higher rate with respect to the deformed clock.

9. The communication control device according to claim 8, wherein the deformed clock includes a series of short clock cycles, each short clock cycle having an ON period that is approximately half of a short clock cycle, and a deformed clock cycle having a deformed ON period approximately equal to three times the ON period.

10. The communication control device according to claim 9, wherein the deformed clock includes a sequence of six short cycles followed by one long cycle.

11. A communication control device according to claim 8, wherein the second digital signal represents a rate of 64 kbit/s.

12. The communication control device according to claim 7, wherein the predetermined digital signal is a single bit signal.

13. A communication control device according to claim 12, wherein the predetermined digital signal is superposed onto the first digital signal in synchronism with the deformed clock at a predetermined bit position in each octet of a stream of octets of binary data.

14. The communication control device according to claim 7, wherein the predetermined digital signal is a multiple bit signal.

15. A communication control device according to claim 14, wherein the predetermined digital signal is superimposed onto the first digital signal in synchronism with the deformed clock at a predetermined position in each of a series of regular intervals in a stream of binary data.

16. A method for digital signal rate adapting, comprising the following steps:
(a) accepting a first receive clock having a first waveform;
(b) partially deforming the first waveform to produce a second waveform having at least one uneven portion;
(c) outputting a second receive clock having the second waveform;
(d) receiving a first digital signal having a first plurality of discrete bits, each discrete bit being defined by a pair of clock edges in the first receive clock; and
(e) combining the first digital signal with the second receive clock to create a second digital signal having a second plurality of discrete bits, each discrete bit being defined by a pair of clock edges in the second receive clock thereby rate adapting the first digital signal.

17. A method for digital signal rate adapting, comprising the following steps:
(a) accepting a transmit clock having a waveform;
(b) partially deforming the waveform of the transmit clock to produce a deformed clock with a deformed waveform, the deformed waveform having (i) an undeformed portion that is identical to a portion of the waveform of the transmit clock and (ii) a deformed portion;
(c) receiving a first digital signal synchronously with edges of the deformed clock, the first digital signal having a first plurality of discrete bits, each discrete bit being defined by a pair of clock edges in the transmit clock; and
(d) forming a second digital signal by superposing a predetermined digital signal onto the first digital signal over a discrete bit of the first digital signal corresponding to the deformed portion of the deformed waveform, thereby adding bits to the stream of bits.

18. A communication control device comprising:
(a) a rate adapting unit including means for accepting a first receive clock having a first waveform, means for receiving a digital signal having a plurality of discrete bits, each discrete bit being defined by a pair of clock edges in the first receive clock, means for partially deforming the first waveform to produce a second waveform, and means for outputting a second receive clock having the second waveform, wherein the second receive clock represents a lower data rate with respect to the first receive clock, and the second receive clock includes a series of short clock cycles, each short clock cycle having an ON period that is approximately half of a short clock cycle, and a deformed clock cycle having a deformed ON period approximately equal to three times the ON period; and (b) means for receiving each bit of at least a portion of the digital signal synchronously with receipt of a clock edge in the second receive clock.

19. The communication control device according to claim 18, wherein the second receive clock includes a sequence of six short cycles followed by one elongated cycle.

20. A communication control device comprising:
(a) a clock processing unit including means for accepting a first receive clock having a first waveform, means for partially deforming the first waveform to produce a second waveform, and means for outputting a second receive clock having the second waveform, wherein the second receive clock represents a lower data rate with respect to the first receive clock; and
(b) a transmit data processing unit including means for receiving a first digital signal, synchronously with edges of the second receive clock, the first digital signal having a plurality of discrete bits, each discrete bit being defined by a pair of clock edges in the second receive clock, and means for outputting a second digital signal produced by combining the first digital signal with a predetermined bit corresponding to a deformed portion of the second receive clock such that a data content of the first digital signal passes into the second digital signal without incurring a storage delay.

21. A method for rate adapting a first digital signal and a second digital signal, wherein the first digital signal and the second digital signal have a period divided into a predetermined number of intervals, comprising the following steps:

(a) receiving a first clock signal having the period with each interval having one rising edge and one falling edge, and the first digital signal, the first digital signal having a plurality of bits being received synchronously with edges of the first clock signal, (b) producing a second clock signal having the period with at least one interval selectively having no rising edge and no falling edge by holding the first clock signal substantially constant during the interval, and (c) sending the second clock signal and the first digital signal to a receiver which creates the second digital signal from the first digital signal by receiving at least a portion of the bits of the first digital signal synchronously with the selective receipt of a rising clock edge and a falling clock edge of the second clock signal.

22. A method for rate adapting a first data output signal and a second data output signal, wherein the first data output signal and the second data output signal have a period divided into a predetermined number of intervals, comprising the following steps:

(a) receiving a first clock signal having the period with each interval having one rising edge and one falling edge, (b) producing a second clock signal having the period with at least one interval selectively having no rising edge and no falling edge by holding the first clock signal substantially constant during the interval, (c) sending the second clock signal to a transmitter which transmits the first data output signal having a plurality of bits, each bit being defined by a rising clock edge and a falling clock edge of the second clock signal, by synchronously holding each bit of the first data output signal substantially constant during intervals when the second clock signal is substantially constant, (d) receiving from the transmitter each bit of the first data output signal synchronously with receipt of one of a rising edge and a falling edge of the first clock signal, (e) producing a second data signal having a plurality of bits and the period by superimposing a predetermined signal over the intervals of the first data output signal that were held substantially constant synchronously during the substantially constant intervals of the second clock signal, and (f) sending the second data signal to a receiver which receives each bit of the second data signal synchronously with an edge of the first clock signal.

23. A communication control device comprising:
(a) a rate adapting unit including means for accepting a first clock signal having a series of clock pulses, wherein each clock pulse occurs in a constant time period, each clock pulse has a first state lasting a first time duration and a second state lasting a second time duration, and a sum of the first time duration and the second time duration is equal substantially to the constant time period;

means for modifying the first clock signal to produce a second clock signal having a series of clock pulses, wherein each clock pulse has a first state lasting a third duration of time, and at least one clock pulse has a first state lasting a fourth duration of time that is longer than the constant time period of the first clock signal; and means for outputting the second clock signal; and (b) a receiver including means for receiving the second clock signal, and means for receiving discrete bits of a data signal, each discrete bit being defined by edges of the first clock signal, synchronously with pulses of the second clock signal.

24. The communication control device according to claim 23 wherein the clock pulse of the second clock signal, that has the first state lasting the first duration that is longer than the constant time period of the first clock signal, has the first state lasting the first duration that is approximately one and a half times as long as the constant time period of the first clock signal.

25. The communication control device according to claim 23 wherein the second clock signal includes six pulses having first durations and second durations approximately equal to the first durations and second durations of pulses of the first clock followed by the pulse that has the first state lasting the first duration that is longer than the constant time period of the first clock signal.

26. A communication control device comprising:
(a) a rate adapting unit including means for accepting a first clock signal having a series of a first time period followed by a second time period, wherein
the first time period is defined by one rising edge and one falling edge,
the second time period is defined by one falling edge and one rising edge, and
the first time period and the second time period are substantially equal throughout the entire first clock signal;
means for modifying the first clock signal to produce a second clock signal having a series of the first time period followed by a third time period, wherein
the third time period is defined by one falling edge and one rising edge, and
the third time period is longer than the first time period; and
means for outputting the second clock signal; and
(b) a receiver including means for receiving the second clock signal and means for receiving discrete bits of a data signal, each discrete bit being defined by edges of the first clock signal, synchronously with edges of the second clock signal.

27. The communication control device according to claim 26, wherein the second time period of the second clock signal has a duration that is approximately one and a half times as long as the first time period.

28. The communication control device according to claim 26, wherein the first time period of the second clock signal is approximately equal to the first time period of the first clock signal.

* * * * *